US007420815B2

(12) United States Patent  (10) Patent No.: US 7,420,815 B2
Love  (45) Date of Patent: Sep. 2, 2008

(54) SYSTEM FOR ASSEMBLING COMPUTERS TO PROVIDE A FAVORABLE IMPORT CLASSIFICATION

(75) Inventor: John Love, Sioux City, IA (US)

(73) Assignee: Gateway Inc., Irvine, CA (US)

( * ) Notice: Subject to any disclaimer, the term of this patent is extended or adjusted under 35 U.S.C. 154(b) by 0 days.

(21) Appl. No.: 10/891,954

(22) Filed: Jul. 15, 2004

(65) Prior Publication Data

US 2005/0099768 A1  May 12, 2005

Related U.S. Application Data

(60) Provisional application No. 60/517,765, filed on Nov. 6, 2003.

(51) Int. Cl.
*H05K 7/14* (2006.01)
(52) U.S. Cl. .................. 361/752; 361/730; 361/796; 361/679; 361/683; 29/830
(58) Field of Classification Search ............... 361/788, 361/725, 747, 732, 760, 759, 730, 796, 683, 361/679, 752; 710/301; 29/830; 174/520
See application file for complete search history.

(56) References Cited

U.S. PATENT DOCUMENTS

| | | | | |
|---|---|---|---|---|
| 5,530,620 A | * | 6/1996 | Sangveraphunsiri | ........ 361/686 |
| 5,673,174 A | | 9/1997 | Hamirani | |
| 5,825,618 A | * | 10/1998 | Schnoor et al. | ............. 361/686 |
| 5,948,087 A | * | 9/1999 | Khan et al. | .................. 710/301 |
| 6,108,199 A | | 8/2000 | Bonardi et al. | |
| 6,307,742 B1 | | 10/2001 | Diaz et al. | |
| 6,374,328 B1 | * | 4/2002 | Rhinehart | .................... 711/115 |
| 6,430,060 B1 | * | 8/2002 | Hsu et al. | .................... 361/814 |
| 6,480,398 B1 | | 11/2002 | Fiora et al. | |
| 6,597,566 B1 | * | 7/2003 | Phan | .......................... 361/683 |
| 6,618,245 B2 | | 9/2003 | Diaz | |
| 6,950,919 B2 | * | 9/2005 | Sharma et al. | ............. 711/170 |
| 7,065,060 B2 | * | 6/2006 | Yun et al. | ................... 370/318 |
| 7,065,599 B2 | * | 6/2006 | King et al. | .................. 710/301 |

* cited by examiner

*Primary Examiner*—Dean A. Reichard
*Assistant Examiner*—Dameon E Levi
(74) *Attorney, Agent, or Firm*—Jeffrey A. Proehl; Woods, Fuller, Shultz & Smith

(57) ABSTRACT

A computer subassembly aspect is disclosed comprising a case defining an interior, a primary circuit board located in the interior of the case, and a BIOS chip socket mounted on the primary circuit board. The case has an opening formed therein that is aligned with a position of the BIOS chip socket on the primary circuit board to permit insertion of a BIOS chip into the BIOS chip socket through the opening. A method of assembling a computer is also disclosed that comprises assembling a subassembly of a laptop computer in a first location, with the subassembly including a BIOS chip socket for receiving a BIOS chip but lacking a BIOS chip, transporting the subassembly from the first location to a second location, and installing a BIOS chip into the BIOS chip socket of the subassembly when the subassembly is in the second location.

7 Claims, 4 Drawing Sheets

SYSTEM FOR ASSEMBLING COMPUTERS TO PROVIDE A FAVORABLE IMPORT CLASSIFICATION

REFERENCE TO RELATED APPLICATION

This non-provisional patent application claims the benefit of U.S. provisional patent application No. 60/517,765, filed Nov. 6, 2003.

BACKGROUND OF THE INVENTION

1. Field of the Invention

The present invention relates to systems of assembling computers and more particularly pertains to a new system for assembling computers that provides a favorable import duty classification for computer subassemblies while also facilitating the completion of the assembly of the computer.

2. Description of the Prior Art

The laws of the United States impose tariffs, in the form of duties, on certain products imported from other countries into the United States, and other countries may impose much the same on products being imported into those countries. In the United States, these duties are imposed pursuant to the Tariff Act of 1930, as amended by the Trade Agreements Act (TAA) of 1979; 19 U.S.C. 1401a(g)), although other laws may also be pertinent to the levying of duties on products entering the country. One manner of avoiding, or at least reducing, the amount of the duty imposed when the products are brought into the United States is to change the tariff classification of the product as it enters the United States. One technique for accomplishing that purpose is to import into the United States substantially complete subassemblies that have been assembled in a foreign country, and then finish or complete the products once the subassemblies arrive in the United States.

In order for a computer to be considered to have been completed or finished in the United States under the various applicable laws and rules (such as those promulgated, applied, and enforced by the United States Customs Service), computer parts or subassemblies that are imported into the United States must undergo a "significant transformation" into a completed computer product once the various parts and subassemblies have been brought into the United States. Thus, under the existing rules, significant portions of a computer may be assembled outside of the borders of the United States and still be considered incomplete or unfinished when imported in the United States if the computer subassembly is not functional as a computer, and thus cannot be classified as an Automatic Data Processing (ADP) machine as defined by the applicable Unites States regulations. Final assembly may then be performed in the United States.

As a result of the tariff structure, subassemblies of computers have been imported into the United States in various states of assembly that have been interpreted as being not functional as an ADP machine, and therefore are incomplete or unfinished under the applicable trade regulations. This practice thus takes advantage of the relatively lower assembly costs in other countries while avoiding additional duties as the products are brought into the country, which would otherwise reduce the cost-savings advantage.

Various ways have been devised to provide a computer subassembly that is as fully assembled as possible while still being non-functional within the interpretation of the tariff laws. For the manufacture of desktop computers and notebook computers, a fairly common way of achieving compliance with the tariff regulations is for the computer to be imported in a substantially fully assembled condition but lack the central processing unit (CPU) integrated circuit chip, which is then inserted into a socket on the motherboard of the computer subassembly once the subassembly arrives in the United States. Other techniques have included the post-importation installation of other components of the computer that, without which, the computer is incapable of operating to input data, process data, and output data.

As computers have become more compact and more lightweight, however, the ability to make these final and completing additions to the computers has been stymied by the close proximity and packing of these components in the computer housing. This is especially true for portable computers. Another complicating factor is that, as the designs for portable computers have become relatively lighter and smaller, the manner of installing the CPU chip has evolved from socket-based mountings to more permanent soldered mountings to reduce internal component height and footprint, which contributes to an overall reduction in the size of the computer chassis. These mountings have made it more difficult, if not relatively impossible, to add the CPU in a highly economical manner after the computer is substantially completely assembled.

Further, access panels and doors are known on portable computers for accessing CPUs, memory cards, wireless communication and modem circuit cards, and hard disk drives, among other components, and the number of access doors on any one portable computer often includes up to four or five (or more). This plethora of access doors generally increases the potential points for radiation leakage from the interior of the computer which may cause radio frequency and electromagnetic interference, especially when the panels are relatively large.

Thus, there exists a need for a simpler and more economical system for completing assembly of computer subassemblies in a manner such that the subassemblies are considered incomplete and unfinished when imported into the United States under applicable tariff regulations but do not stymie the use of the most compact processors and packaging for the portable computer.

SUMMARY OF THE INVENTION

The system of the present invention facilitates compliance of an imported portable computer subassembly with the requirements defining an incomplete automatic data processing machine under the aforementioned tariff regulations, while facilitating the simple and inexpensive completion of the portable computer subassembly once imported.

In one aspect of the invention, a computer subassembly comprises a case defining an interior, a primary circuit board located in the interior of the case, and a Basic Input-Output System (BIOS) chip socket mounted on the primary circuit board. The case has an opening formed therein that is aligned with a position of the BIOS chip socket on the primary circuit board to permit insertion of a BIOS chip into the BIOS chip socket through the opening.

The computer subassembly may be further characterized by a BIOS chip for mounting on the BIOS chip socket and being movable through the opening of the case, and the case may further include a cover for covering the opening in the case. The cover may form a portion of the exterior surface of the case when the cover is positioned over the opening. The primary circuit board may have a first side and a second side, with the BIOS chip socket being located on the second side of the primary circuit board and a central processor unit chip being positioned on the first side of the primary circuit board opposite of the BIOS chip socket on the second side.

In another aspect of the invention, a method of assembling a computer includes assembling a subassembly of a laptop computer in a first location. The subassembly includes a BIOS chip socket for receiving a BIOS chip, but the BIOS chip socket lacks a BIOS chip. The method further includes transporting the subassembly from the first location to a second location, and installing a BIOS chip into the BIOS chip socket of the subassembly when the subassembly is in the second location.

The method aspect of the invention may be further characterized by the first location being located outside of the United States, and the second location being located in the United States. The step of transporting the subassembly may comprise transporting the subassembly from outside of the United States into the United States. The subassembly may be characterized by being substantially operational as a computing device upon installation of a BIOS chip in the BIOS chip socket, and the step of installing the BIOS chip in the BIOS chip socket may thus produce a functional computer.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

A significant advantage of the present invention is that a computer subassembly may be brought into a country such as the United States in a substantially assembled condition but still be considered to be incomplete and non-functional under existing tariff regulations, to secure a relatively lower duty level as compared to a complete and functional computer. The computer subassembly may then be completed in the United States by simply adding a BIOS chip to the computer subassembly, and the structural features of the invention facilitate the installation of the BIOS chip in a simple and straightforward manner that minimizes final assembly costs.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

With reference now to the drawings, and in particular to FIGS. 1 through 4 thereof, a new system for assembling computers to provide a favorable import classification embodying the principles and concepts of the present invention will be described.

Figure 1:
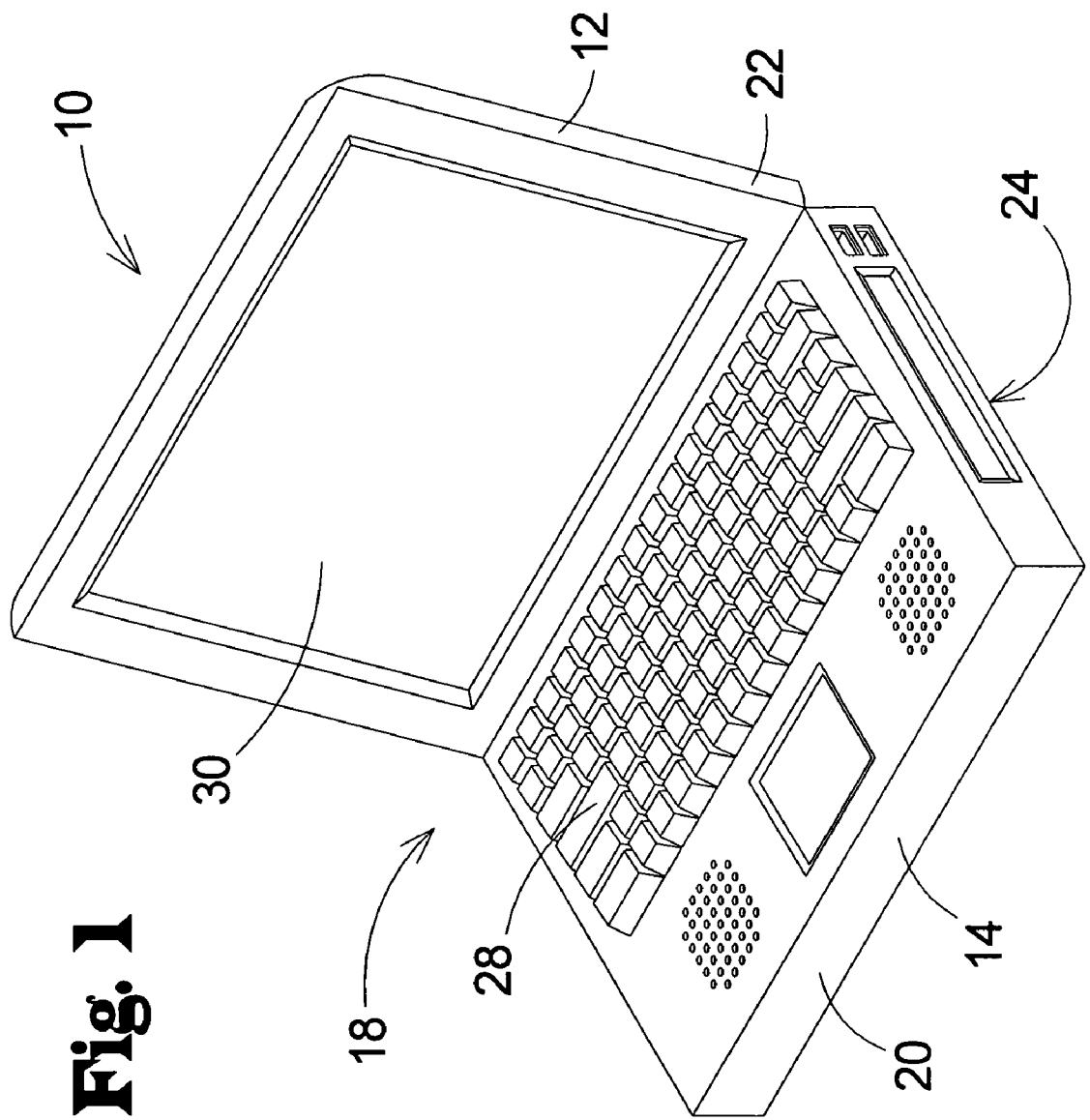
FIG. 1 is a schematic perspective view of a portable computer embodying an apparatus implementation of the present invention.
Figure 2:
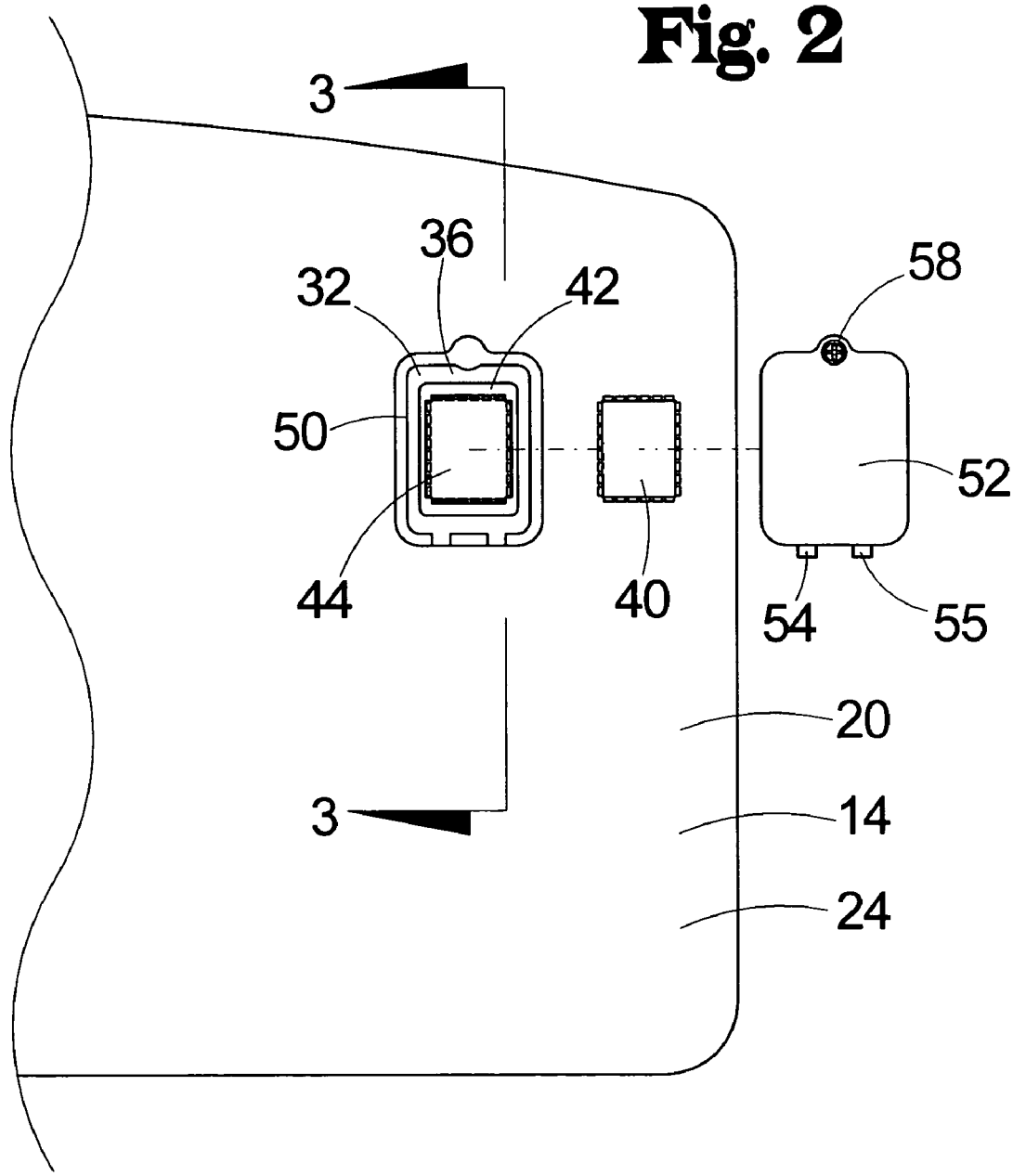
FIG. 2 is a schematic bottom view of the portable computer embodying the apparatus implementation of the present invention.
Figure 3:
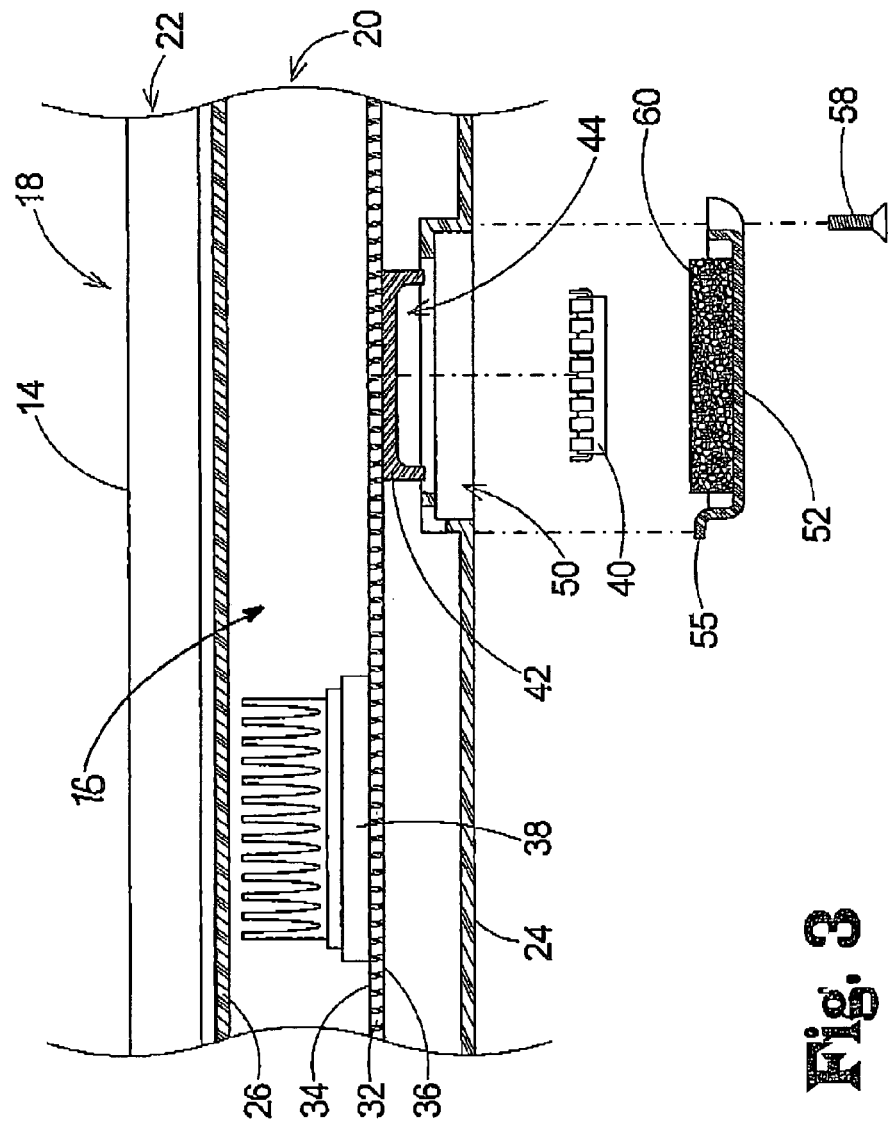
FIG. 3 is a schematic side sectional view of the portable computer taken along line 3-3 of FIG. 2 that embodies the apparatus implementation of the present invention.

Referring initially to FIGS. 1 through 3 of the drawings, and in particular FIG. 1, one aspect of the invention contemplates an apparatus embodied in a portable computer 10, which may be of the types of computers referred to as notebook computers, laptop computers, tablet computer, and related products. The portable computer 10 is generally characterized by all of the essential components of the computer, including processor, keyboard (or other means for manual input of data), display, pointing device, and the like, being integrated into a single case to be transported and operated as a single substantially self-contained unit. The portable computer 10 may thus be distinguished from other types of computers, such as desktop computers, which are characterized by at least some of the major components, such as the keyboard and display, being separate and distinct from the case that houses the processing circuitry and associated memory and storage devices. However, it is contemplated that some aspects of the present invention might be implemented on relatively larger computers with desktop or tower configurations.

The portable computer 10 implementing the invention includes a case 12 which forms an exterior for the computer and bears the exterior surface 14 of the computer. The case 12 also defines an interior 16 that contains the functional components and circuitry of the computer 10. In many applications of the invention, the case 12 comprises a clamshell housing 18, although it will be appreciated by those skilled in the art that the case of the portable computer 10 may comprise a tablet housing that may include only a single portion, or a case that is convertible between tablet and clamshell housings. The clamshell housing 18 may include a primary portion 20 and a secondary portion 22. During active usage of the portable computer 10, the primary portion 20 of the clamshell housing 18 is typically rested on a substantially horizontal surface, and the primary portion 20 has a bottom 24 which is oriented downwardly and is rested on the substantially horizontal surface. A top 26 of the primary portion 20 is oriented toward the user of the portable computer 10, and typically includes a keyboard 28. The secondary portion 22 of the clamshell housing 18 typically includes the display 30 of the portable computer, and is positioned such that the primary 20 and secondary 22 portions of the clamshell housing 18 may be pivoted into an adjacent and closed condition that positions the display 30 and the keyboard 28 proximate to each other in a manner that tends to protect the display and the keyboard from damage during transport.

Referring now particularly to FIG. 3, the portable computer 10 includes a primary circuit board 32 located in the interior 16 of the case 12. The primary circuit board 32 may form the motherboard of the computer 10 on which most or all of the processing components (including the CPU and memory) and main circuitry (including various busses) are located. The primary circuit board 32 is located in the primary portion 20 of the clamshell housing 18 between the top 26 and bottom 24 thereof. The primary circuit board 32 has first 34 and second 36 sides which are located opposite each other. The first side 34 of the primary circuit board 32 may be oriented toward the top 26 of the primary portion 20 of the clamshell housing 18, and the second side 36 of the primary circuit board 32 may be oriented toward the bottom 24 of the primary portion 20. In the normal usage position of the portable computer 10, the first side 34 of the primary circuit board 32 is thus oriented in an upward direction and the second side 36 of the primary circuit board 32 is oriented in a downward direction. In one embodiment of the invention, the first side 34 of the primary circuit board 32 is primarily occupied by various electronic components, and the second side 36 is primarily occupied by soldered connections, although a significant exception to this generalization will be described below.

The circuitry resident in the interior 16 of the case 12 of the portable computer 10 includes a processor chip 38 that may be relatively permanently affixed to the primary circuit board 32. The processor chip 38 may function as the central processing unit (CPU) of the computer 10, and in at least one embodiment of the invention the CPU is located on the first side 34 of the primary circuit board 32.

Referring especially to FIGS. 2 and 3, a significant aspect of the invention is a Basic Input-Output System (BIOS) integrated circuit chip 40 that is mountable on a substantially assembled, but non-functional, subassembly of the portable computer 10 to create a functional portable computer 10. While the BIOS chip 40 may also be removable from the portable computer 10 once it has been mounted on the subassembly, it is the initial mountability of the BIOS chip 40 on the subassembly of the computer 10 in a simplified manner that is vital to the invention. Thus the BIOS chip 40 is not necessarily removable from the BIOS chip socket 42 once installed.

The BIOS chip 40 stores the BIOS, which is a set of instructions that may activate the various peripheral devices of the computer, including the keyboard, display screen, input/output ports, as well as other devices. The BIOS instructions may also include various autostart functions that test the system upon startup (such as the Power On Self Test (POST) operation) and prepares the system for normal operation, such as by loading the operating system and delivering control to the operating system once the initial testing of the system has been completed. The BIOS chip 40 that contains the set of instructions is typically a Read Only Memory (ROM) chip, although in less preferred embodiments of the invention the chip may be programmable after installation in the computer (such as through the use of a Programmable ROM chip or an Erasable Programmable ROM chip).

Referring particularly to FIG. 3, in order to provide this important BIOS chip mountability feature, the portable computer 20 includes a BIOS chip receiving socket 42 for receiving the BIOS chip 40. The BIOS chip socket 42 is mounted on the primary circuit board 32, and may be mounted on a side 34, 36 of the primary circuit board 32 opposite of the side 34, 36 of the primary circuit board 32 that has the CPU chip 38 mounted thereon. Thus, if the CPU chip 38 is mounted on the first side 34 of the primary circuit board 32, the BIOS chip socket 42 is mounted on the second side 36 of the primary circuit board 32.

The BIOS chip 40 is thus able to be mounted on the BIOS chip socket 42 and in turn on the primary circuit board 32, so that the BIOS chip 40 is mounted on the lower, second side 36 of the primary circuit board 32.

As shown in FIGS. 2 and 3 of the drawings, a highly significant aspect of the invention is an opening 50 that is formed in the case 12 for permitting the BIOS chip 40 to be installed in the BIOS chip socket 42 on the primary circuit board 32 of a subassembly of a substantially fully assembled, but non-functional, condition to complete the computer 10. The opening 50 permits access to the BIOS chip socket 42 on the primary circuit board 32 from the exterior of the case 12 when the case is in a substantially fully assembled condition so that the computer 10 may be substantially fully assembled without installing the BIOS chip 40 on the primary circuit board 32, and the BIOS chip 40 is able to be installed on the primary circuit board 32 at a time after the assembly of the computer case without having to disassemble any significant portion of the case in order to install the BIOS chip 40 on the primary circuit board 32. The opening 50 is preferably located in the bottom 24 of the primary portion 20 of the clamshell housing 18 of the case 12, such that the opening 50 is located opposite of the keyboard 28.

The opening 50 in the case 12 is aligned or coincident with the position of the BIOS chip socket 42 on the primary circuit board 32 to facilitate the insertion of the BIOS chip 40 through the opening 50 and into the BIOS chip socket 42. In some embodiments, the opening 50 may be substantially centered on the BIOS chip socket 42.

As the opening 50 may provide a point of leakage of radio frequency or electromagnetic energy from the interior 16 of the case 12, and cause interference in adjacent devices, the size of the opening 50 is preferably as small as possible while still permitting free movement of the BIOS chip 40 through the opening 50. The opening 50 in the case 12 is preferably sized so that access through the opening is limited substantially to the BIOS chip socket 42 on the primary circuit board 32 to thereby minimize any chance of inadvertently interfering with the primary circuit board 32 or adjacent components on the primary circuit board 32 (if any) during final assembly.

The opening 50 in the case 12 may be slightly larger in area than the area of the BIOS chip socket 42, or the recess 44 in the BIOS chip socket 42. The opening 50 may have a dimension that is substantially coextensive with the BIOS chip socket 42 or slightly somewhat larger. The area of the opening 50 may range between approximately 90 percent to approximately 150 percent of the area of the BIOS chip socket 42. The area of the opening 50 in the case 12 may even range up to approximately 200 percent of the area of the BIOS chip socket 42, but expansion of the area of the opening 50 significantly beyond this size relationship increases the likelihood that the aforementioned conditions may become problematic. In one implementation of the invention, the opening 50 in the case 12 is approximately 1 inch (approximately 2.5 centimeters) by 1.25 inches (approximately 3.2 cm).

A cover 52 is included for covering the opening 50 in the case 12, and in some embodiments of the invention the cover 52 is removable and reattachable to the case. Significantly, the cover 52 forms a portion of the exterior of the case 12, and thus a portion of the exterior surface 14 of the case 12, to thereby facilitate direct access to the BIOS chip socket 42 for installation of the BIOS chip 40 in the socket 42 without having to disassemble any other portions of the case 12 of the computer 10, which minimizes the effort and thus cost of installing the BIOS chip 40 in the BIOS chip socket 42. The cover 52 closes the opening 50 when installed on the case 12, and is generally aligned with the position of the BIOS chip socket 42 on the primary circuit board 32. The cover 52 may be coextensive with the opening 50 in the case 12, but is preferably slightly larger in size than the opening 50 to produce an overlap of the cover 52 over edges of the case 12 adjacent to the opening 50.

The cover 52 may additionally include one or more tabs 54, 55 for engaging recesses in the edge of the case 12 that defines the opening 50, to thereby form a separable locating hinge structure for the cover 52 on the case 50, although the cover 52 in some embodiments of the invention is separable from the case 12 for facilitating the insertion of the BIOS chip 40 in the BIOS chip socket 42.

As particularly notable in FIG. 3, a fastener 58 or other fastening means may be provided for fastening and securing the cover 52 on the case 12 over the opening 50. In some embodiments of the invention, the fastener 58 permits removal of the cover 52 from the case 12 after the cover 52 has initially been fastened to the case 12 once insertion of the BIOS chip 40 in the BIOS chip socket 42 has occurred. In the illustrative embodiment of the invention, the fastener 58 comprises a screw that extends through an aperture formed in the cover 52 and that extends into a threaded hole in the case 12, although those skilled in the art will recognize other fasteners that may be employed. The fastener 58 is preferably positioned on the cover 52 in a location opposite of the tabs 54, 55 on the cover 52 so that the cover can be secured at opposite ends to the case 12.

While the means of fastening the cover to the case preferably permits removal and reattachment of the cover 52 to the case 12 for subsequent access to the BIOS chip 40 after the initial installation, it will be recognized by those skilled in the art that since repeated access to the BIOS chip 40 and the BIOS chip socket 42 is typically not required after the initial installation of the BIOS chip 40 on the socket 42, the fastening of the cover 52 to the case 12 may be adapted for one-time, and substantially permanent, installation on the case 12 (using, for example, an adhesive) after the BIOS chip 40 has been seated in the BIOS chip socket 42 so that the cover 52 is not readily removable from the case 12.

The invention may also include means for biasing the BIOS chip 40 into the BIOS chip socket 42. In one embodiment of the invention, a piece 60 of resiliently compressible material that is mounted or secured on an inside of the cover 52 in a manner that permits positioning of the piece 60 of material between the cover 52 and the BIOS chip 40 so that the material applies biasing pressure on the BIOS chip 40 toward the BIOS chip socket 42 when the cover 52 is in place on the case 12.

Figure 4:
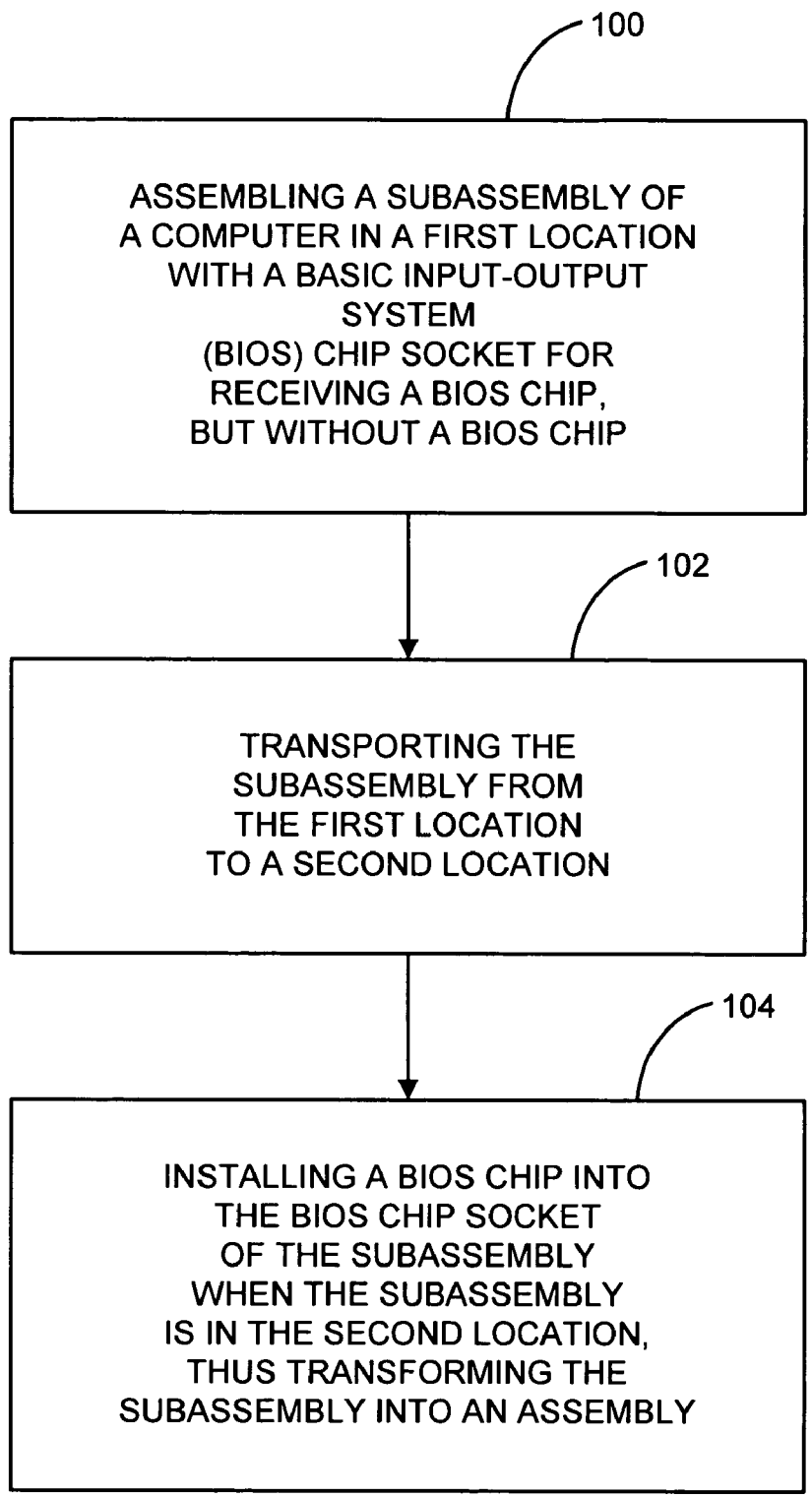
FIG. 4 is a schematic diagram of the steps of a method implementation of the present invention.

Turning now to FIG. 4 of the drawings, another aspect of the invention contemplates a method of assembling a computer, and most particularly a portable computer, that is implemented in a manner that entails two phases of assembly, with an initial phase of the assembly process producing a computer subassembly that is substantially complete, but is considered incomplete and non-functional under the interpretation of the tariff classifications, and a final phase of assembly in which the assembly of the computer is completed and the computer made functional by adding the BIOS chip to the subassembly by a simple procedure facilitated by features of the construction of the subassembly.

In greater detail, the initial phase of assembly includes assembling a subassembly of the computer with all components necessary for operation, including the BIOS chip socket 42, without the BIOS chip 40 having the BIOS instructions for operating the computer (block 100). The initial assembly of the subassembly of the computer 10 occurs in a first location, and in some implementations of the invention, the first location will be outside of the United States. The subassembly of the computer 10 includes a case 12, and an opening 50 in the case 12 that is coincident or aligned with the BIOS chip socket 42. The subassembly may be characterized by being substantially operational as a computing device once the BIOS chip 40 is installed in the BIOS chip socket 42, and thus produces a functional computer, but non-functional without the BIOS chip.

The subassembly is transported from the first location to a second location (block 102), and in some implementations, the second location is inside the United States so that the movement of the computer subassembly occurs from outside the United States to inside the Unites States.

In the subsequent or final phase of assembly, the BIOS chip 40 is installed into the BIOS chip socket 42 of the subassembly when the subassembly is in the second location (block 104), and in some implementations of the method the second location is located in the United States.

The invention provides significant benefits in the assembly of computers, and in particular portable computers, as the BIOS chip of a computer is typically smaller than, for example, the CPU of the computer, and thus is easier to install as a final, or substantially final, step of the assembly process. Further, as the design of the BIOS chip is typically more stable and unvarying than the design of the CPU chip, the location and size of the BIOS chip on the primary circuit board varies less than the CPU, making it more suitable for installation through an opening in the case.

The foregoing is considered as illustrative only of the principles of the invention. Further, since numerous modifications and changes will readily occur to those skilled in the art in view of the disclosure of this application, it is not desired to limit the invention to the exact embodiments, implementations, and operations shown and described. Accordingly, all equivalent relationships to those illustrated in the drawings and described in the specification, including all suitable modifications, are intended to be encompassed by the present invention that fall within the scope of the invention.

I claim:

1. A method of assembling a computer, comprising:
   assembling a subassembly of a computer in a first location, the subassembly including a Basic Input-Output System (BIOS) chip socket for receiving a BIOS chip, the BIOS chip socket lacking a BIOS chip;
   transporting the subassembly from the first location to a second location; and
   installing a BIOS chip into the BIOS chip socket of the subassembly when the subassembly is in the second location;
   wherein the first location is outside of the United States and the second location is inside of the United States such that the subassembly is transported into the United States without the BIOS chip in the BIOS chip socket.

2. The method of claim 1 wherein the subassembly is characterized by being not functional as an operational computer prior to installation of the BIOS chip in the BIOS chip socket, and the subassembly is characterized by being operational as a computing device upon an installation of a BIOS chip in the BIOS chip socket.

3. The method of claim 1 wherein the step of installing the BIOS chip in the BIOS chip socket produces a functional computer.

4. The method of claim 1 wherein the step of assembling the subassembly of the computer includes forming a case for the computer and providing an opening in the case that is coextensive with the BIOS chip socket.

5. The method of claim 4 wherein the step of installing the BIOS chip includes moving the BIOS chip from a position external to the case through the opening and into the BIOS chip socket.

6. The method of claim 5 wherein the step of installing the BIOS chip includes placing a cover over the opening in the case to form a portion of the exterior of the case.

7. A portable computer subassembly comprising:
   a portable computer case having first and second portions of the case connected in a clamshell arrangement, one of the portions defining an interior;

a motherboard located in the interior of the case; and a Basic Input-Output System (BIOS) chip socket directly mounted on the motherboard;

a BIOS chip removably mounted on the BIOS chip socket, the BIOS chip being characterized by having loaded thereon a set of instructions for a power-on self test (POST) procedure such that absence of the BIOS chip from the BIOS chip socket prevents the POST procedure from being performed and the computer subassembly is characterized by being non-functional as an operational computer if the BIOS chip is not mounted on the BIOS chip socket; and wherein the case has an opening formed therein that is configured with respect to a position of the BIOS chip socket on the motherboard such that the BIOS chip is capable of being moved through the opening of the case and being mounted on the BIOS chip socket;

wherein the opening in the case is substantially coextensive and aligned with the BIOS chip socket.

* * * * *